United States Patent
Lauterbach et al.

(10) Patent No.: US 8,140,719 B2
(45) Date of Patent: Mar. 20, 2012

(54) DIS-AGGREGATED AND DISTRIBUTED DATA-CENTER ARCHITECTURE USING A DIRECT INTERCONNECT FABRIC

(75) Inventors: Gary Lauterbach, Los Altos, CA (US); Anil R. Rao, Cupertino, CA (US)

(73) Assignee: Sea Micro, Inc., Santa Clara, CA (US)

( * ) Notice: Subject to any disclaimer, the term of this patent is extended or adjusted under 35 U.S.C. 154(b) by 429 days.

(21) Appl. No.: 12/435,618

(22) Filed: May 5, 2009

(65) Prior Publication Data
US 2009/0216920 A1    Aug. 27, 2009

Related U.S. Application Data

(63) Continuation-in-part of application No. 12/136,711, filed on Jun. 10, 2008, now Pat. No. 7,925,802.

(60) Provisional application No. 60/936,513, filed on Jun. 21, 2007.

(51) Int. Cl.
*G06F 3/00* (2006.01)
*G06F 5/00* (2006.01)

(52) U.S. Cl. ........................................................ 710/36

(58) Field of Classification Search .................. None
See application file for complete search history.

(56) References Cited

U.S. PATENT DOCUMENTS

| | | | |
|---|---|---|---|
| 5,263,139 A | 11/1993 | Testa et al. | |
| 5,408,649 A | 4/1995 | Beshears et al. | |
| 5,423,037 A | 6/1995 | Hvasshovd | |
| 5,696,895 A | 12/1997 | Hemphill et al. | |
| 5,877,938 A | 3/1999 | Hobbs et al. | |
| 6,138,166 A | 10/2000 | Heller et al. | |
| 6,684,268 B1 * | 1/2004 | Paluzzi | 710/33 |
| 6,973,517 B1 | 12/2005 | Golden et al. | |
| 6,977,900 B2 | 12/2005 | Wiedeman et al. | |

(Continued)

FOREIGN PATENT DOCUMENTS

WO    WO 2006093929 A2 *    9/2006

OTHER PUBLICATIONS

Intel Corporation, "Blade Server Benefis: Evaluating new server technology in an IT environment", White Paper, May 2004, pp. 1-12.*

(Continued)

*Primary Examiner* — Eron J Sorrell
*Assistant Examiner* — Dayton Lewis-Taylor
(74) *Attorney, Agent, or Firm* — gPatent LLC; Stuart T. Auvinen

(57) ABSTRACT

A data center has several dis-aggregated data clusters that connect to the Internet through a firewall and load-balancer. Each dis-aggregated data cluster has several dis-aggregated compute/switch/disk chassis that are connected together by a mesh of Ethernet links. Each dis-aggregated compute/switch/disk chassis has many processing nodes, disk nodes, and I/O nodes on node cards that are inserted into the chassis. These node cards are connected together by a direct interconnect fabric. Using the direct interconnect fabric, remote I/O and disk nodes appear to the operating system to be located on the local processor's own peripheral bus. A virtual Ethernet controller and a virtual generic peripheral act as virtual endpoints for the local processor's peripheral bus. I/O and disk node peripherals are virtualized by hardware without software drivers. Rack and aggregation Ethernet switches are eliminated using the direct interconnect fabric, which provides a flatter, dis-aggregated hierarchy.

20 Claims, 12 Drawing Sheets

U.S. PATENT DOCUMENTS

| | | |
|---|---|---|
| 6,996,681 B1 | 2/2006 | Autechaud |
| 7,328,284 B2 * | 2/2008 | Rimmer ........................ 709/250 |
| 2005/0063354 A1 | 3/2005 | Garnett et al. |
| 2006/0106922 A1 | 5/2006 | Arregoces et al. |
| 2006/0253619 A1 * | 11/2006 | Torudbakken et al. ......... 710/31 |
| 2007/0255814 A1 | 11/2007 | Green et al. |
| 2008/0253085 A1 | 10/2008 | Soffer |
| 2009/0037585 A1 | 2/2009 | Miloushev et al. |
| 2009/0063665 A1 | 3/2009 | Bagepalli et al. |
| 2009/0063811 A1 | 3/2009 | Arimilli et al. |

OTHER PUBLICATIONS

Vijoy et al., "Blade server system with at least one rack-switch having multiple switches interconnected and configured for management and operation as a single virtual switch", WO 2006/093929 A.*

* cited by examiner

DIS-AGGREGATED CLUSTER

DIS-AGGREGATED CLUSTER

DIS-AGGREGATED AND DISTRIBUTED DATA-CENTER ARCHITECTURE USING A DIRECT INTERCONNECT FABRIC

RELATED APPLICATION

This application is a continuation-in-part (CIP) of the co-pending application for "Hardware-Based Virtualization of BIOS, Disks, Network-Interfaces, & Consoles Using a Direct Interconnect Fabric", U.S. Ser. No. 12/136,711, filed Jun. 10, 2008, which is a non-provisional of the provisional application for "Computer System with Networked Virtual I/O and Memory", U.S. Ser. No. 60/936,513, filed Jun. 21, 2007.

FIELD OF THE INVENTION

This invention relates to computer server systems, and more particularly for distributed data centers using a direct-interconnect fabric to reduce external switching.

BACKGROUND OF THE INVENTION

The rapid and continual decrease in cost and increase in complexity of silicon devices has allowed for multiple processors to be used in specialized compute nodes on a network. Specialized storage nodes can have arrays of disk drives to store databases or other files that are accessed by the compute nodes. Ethernet switches, routers, firewalls, and load-balancer devices can connect the compute nodes to an external networks such as the Internet. Several clusters of compute and storage nodes can each have switches to allow connection to other clusters over the Internet, allowing all clusters to operate as a large multi-processing server system even when the clusters are remotely located from one another.

FIG. 1 shows a multi-cluster server system. Two clusters are shown, and these clusters may be located together in a single location or may be remote from each other and connected by network 208 which can be the Internet or another network such as a virtual-private network (VPN), an Intranet, leased trunk lines, or other kinds of network.

In cluster A, storage nodes 204 contain databases and other files that are accessed by compute nodes 202. Compute nodes 202 include processing nodes that run server software to respond to client requests received over network 208. Switch chassis 206 contains Ethernet or other Local-Area-Network (LAN) switches and routers that connect compute nodes 202, and a load-balancer to distribute incoming client requests among servers running in compute nodes 202. Firewall or other gateway programs may be running on switch chassis 206. Any or all of the storage, Load Balancer, firewall, etc. may or may not be present in the configuration.

Cluster B also has storage nodes 214 and compute nodes 212. Switch chassis 216 contains switches and routers that connect compute nodes 212, and a load-balancer to distribute incoming client requests among servers running in compute nodes 212.

Compute nodes 202 are typically located together in one or more chassis. Each chassis contains slots or racks, and each rack can have multiple processors on one or more printed-circuit boards (PCBs) that slide into the rack. Storage nodes 204 are typically located in a separate chassis, such as for Network-Attached Storage (NAS) or Storage-Area Networks (SAN), since the rotating disk drives often have a different physical form factor than the compute PCB's in compute nodes 202. Some systems may just have a disk drive on a rack mount in a shared chassis. Disk controller cards are also located in storage nodes 204, and these controller cards likewise often have different form factors than processor cards in compute nodes 202.

One or more local switches can be placed in each chassis for compute nodes 202 and storage nodes 204. However, switch chassis 206 contains cluster-wide switching devices and a load-balancer, firewall, and gateway devices that are used by the whole cluster. These specialized devices often have differing form factors and may be located in separate specialized chassis or in switch chassis 206 Thus three kinds of chassis or cabinets are often used together in each cluster, for compute nodes 202, storage nodes 204, and switch chassis 206.

FIGS. 2A-C are diagrams of a prior-art data center with three levels of hierarchy. In FIG. 2A, in the lowest level of the data center's hierarchy, three compute nodes 220 and one storage node 224 are located together on rack 230. Storage node 224 could be a controller card to a disk drive located in a separate chassis, or could be in a same chassis with compute nodes 220.

Rack 230 also contains rack switch 222. Rack switch 222 is an Ethernet switch that connects to compute nodes 220 and storage node 224 using Ethernet links 228. Rack switch 222 also has an external link, cluster Ethernet link 226, which links to the next higher level of the data center's hierarchy.

In FIG. 2B, in the middle level of the data center's hierarchy, four racks 230 and aggregation switch 232 are located together in cluster 240. Each rack 230 also contains rack switch 222, which connects to aggregation switch 232 over cluster Ethernet links 226. Aggregation switch 232 is an Ethernet switch has an external link, data-center Ethernet link 236, which links to the next higher level of the data center's hierarchy.

In FIG. 2C, in the top level of the data center's hierarchy, four clusters 240 and core switch 242 are located together in data center 250. Each cluster 240 also contains aggregation switch 232, which connects to core switch 242 over data-center Ethernet links 236. Core switch 242 is an Ethernet switch has an external link that connects to Internet 246 through firewall and load-balancer 248, which acts as a gateway device.

While such aggregated data-center architectures are useful, the multiple levels of hierarchy each have Ethernet or other LAN switches. These switches are expensive and slow the passage of messages and packets. Furthermore, the different form factors of compute nodes and switches may require different kinds of chassis to be used, or even more expensive specialized chassis with local switches such as rack switches 222 in clusters 240.

What is desired is a data center architecture that reduces the number of LAN switches. It is desired to eliminate rack switch 222 and aggregation switch 232 by using a direct interconnect fabric that directly connects processor and storage nodes. It is desired to expand the use of this direct interconnect fabric to include the functions of rack switch 222 and aggregation switch 232. It is further desired to expand the use of a direct interconnect fabric that is used to transparently virtualize peripherals such as Network Interface cards, Ethernet cards, hard disks, BIOS, and consoles.

DETAILED DESCRIPTION

The present invention relates to an improvement in data center architectures. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The parent application disclosed an interconnect fabric that is inserted between processors and main memory, and peripheral devices. An interconnect interface device connects each processor and its main memory to the interconnect fabric, while a device manager connects a remote peripheral bus to the interconnect fabric. The remote peripheral bus can connect to Ethernet cards, hard disks, BIOS, and consoles. The processors may share the peripheral devices on the remote peripheral bus.

The remote peripherals are transparently virtualized by the hardware of the interconnect device and device manager, and can be remotely shared using the interconnect fabric. Since hardware devices connect through the interconnect fabric, virtualization is transparent to software and the operating systems.

Figure 1:
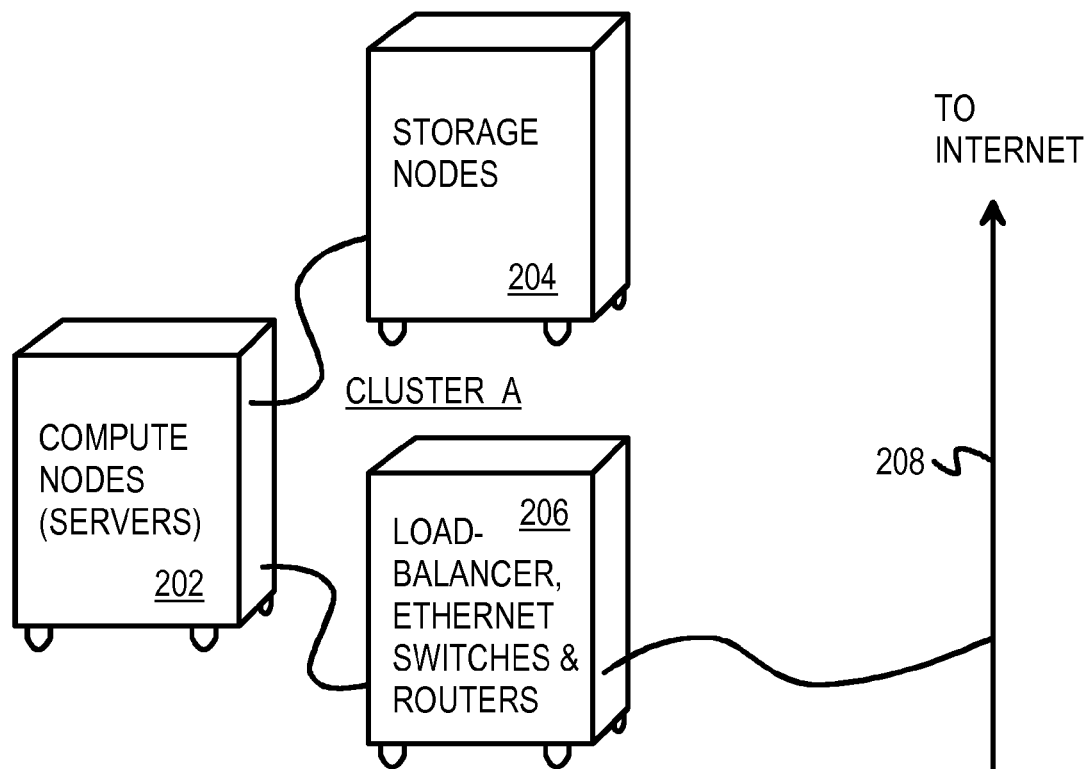
FIG. 1 shows a multi-cluster server system.
Figure 1:
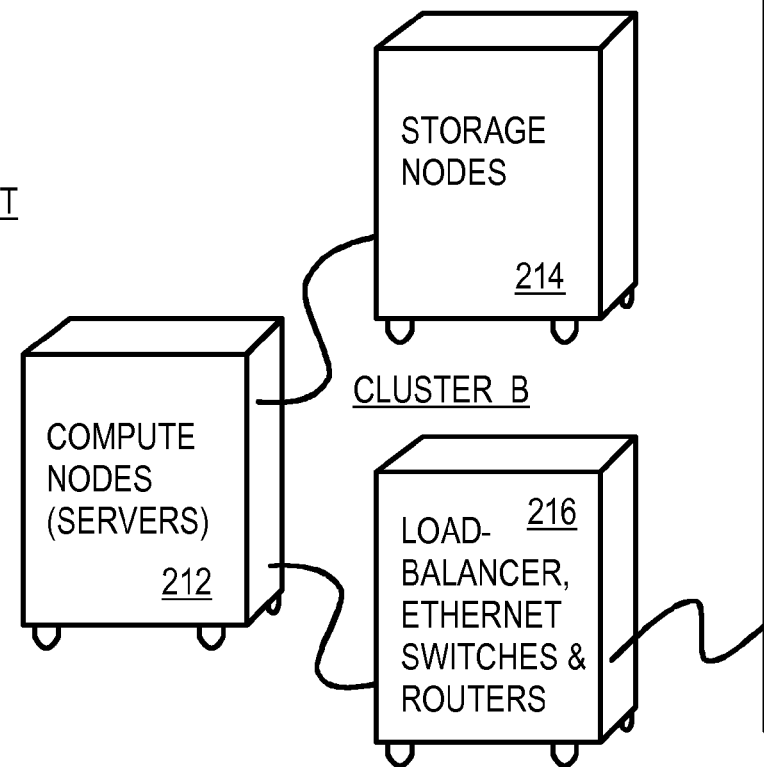
Figure 2A:
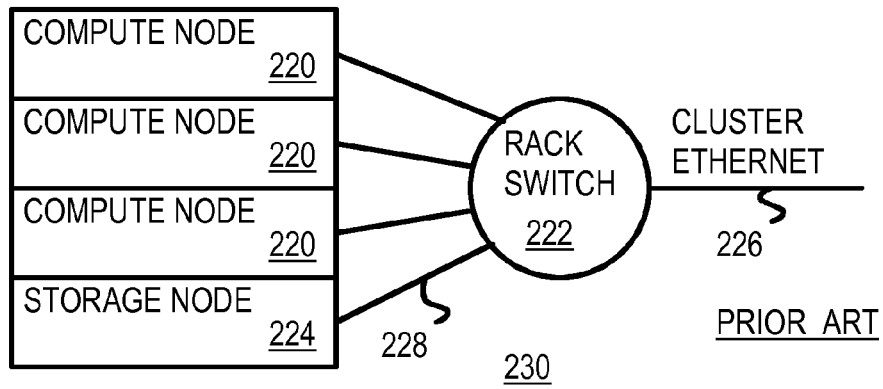
FIGS. 2A-C are diagrams of a prior-art data center with three levels of hierarchy.
Figure 2B:
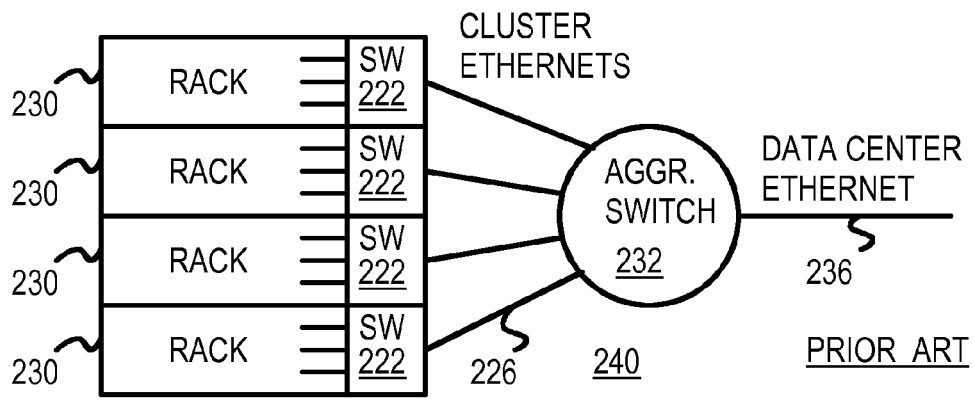
Figure 2C:
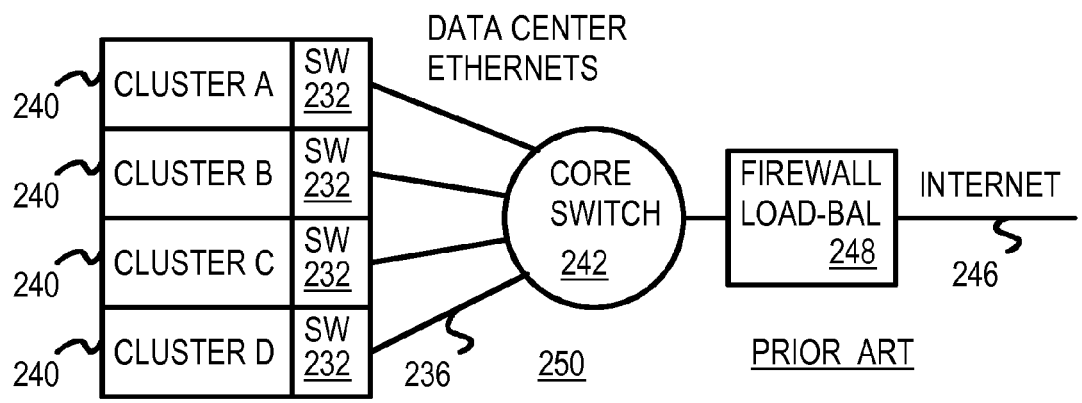

The inventors have realized that the direct interconnect fabric disclosed in the parent application can be useful for more than just virtualization of peripherals. The direct interconnect fabric can also be used to perform switching functions in a data center, such as those typically done by rack switch 222 and aggregation switch 232 of FIG. 2. Performing these switching functions in the direct interconnect fabric can flatten the hierarchy in a data center, reducing the number of LAN switches required. Specialized aggregated chassis of several different types can be replaced by a dis-aggregated chassis that includes both compute nodes and storage nodes along with the switching functions performed by the direct interconnect fabric.

Parent Application—FIGS. 3-6

Figure 3:
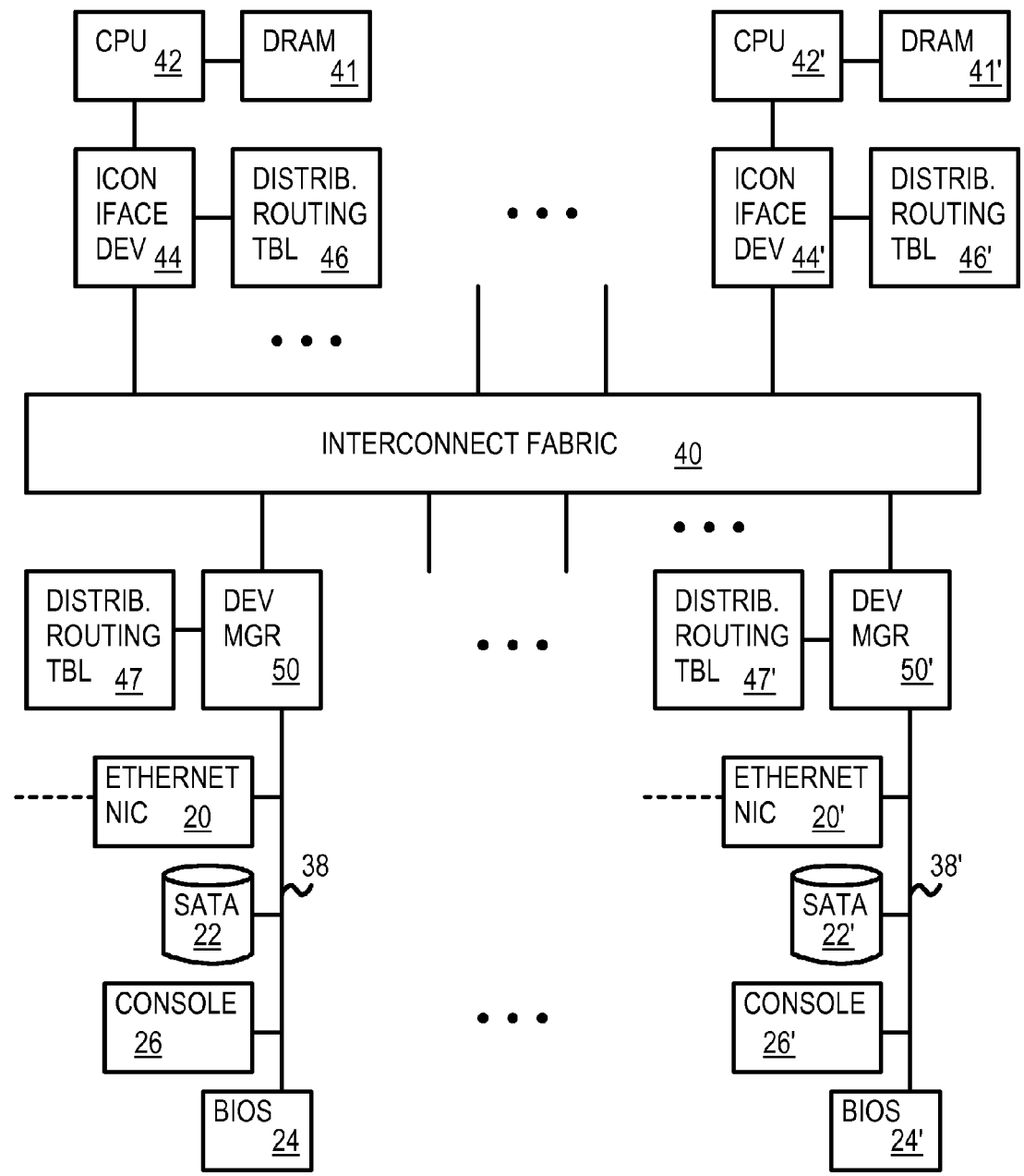
FIG. 3 shows multiple compute nodes that share virtualized peripherals that connect through an interconnect fabric.

FIG. 3 shows multiple compute nodes that share virtualized peripherals that connect through an interconnect fabric. CPU 42 executes instructions and writes data in local DRAM 41, while CPU 42' uses its local DRAM 41'. Neither CPU 42, 42' has its own peripherals. Neither CPU 42, 42' has a local BIOS or a local network interface card (NIC). Instead, remote peripherals are shared and virtualized.

For example, both CPU 42, 42' can access a network through Ethernet card 20 on first peripheral bus 38, and can read data on hard disk 22 on first peripheral bus 38. Alternately, CPU 42, 42' could read data from hard disk 22' on second peripheral bus 38', or connect to an external network using Ethernet card 20' on second peripheral bus 38'. A backup Ethernet connection is available using Ethernet cards 20, 20' on two peripheral buses 38, 38'.

CPU 42 could write status to console 26, while CPU 42' writes its status to second console 26', or both CPU 42, 42' could write status to the same console, either first console 26 or second console 26'. Likewise, either CPU could access BIOS 24 or first hard disk 22 on first peripheral bus 38 or second BIOS 24' or second hard disk 22' on second peripheral bus 38'.

Interconnect fabric 40 connects many processing nodes with several shared peripheral buses. Each processing node has a processor, main memory, and interconnect interface device 44 that connects to interconnect fabric 40. Each shared peripheral bus 38, 38' has a number of peripheral devices, such as Ethernet 20, hard disk 22, BIOS 24, and console 26, and device manager 50 that connects to interconnect fabric 40.

Interconnect interface device 44 uses distributed routing table 46 to map addresses from local CPU 42 to a remote peripheral device. An address of one of device managers 50, 50' for a peripheral bus 38, 38' is located in a mapping entry in distributed routing table 46, or a new mapping entry is created.

Device manager 50 uses its own distributed routing table 47 to map incoming requests to one of its devices on first peripheral bus 38, and to map outgoing responses to interconnect interface device 44 for the designated one of the processing nodes. Device manager 50 adds an interconnect address for interconnect interface device 44 to the response from its peripheral device on first peripheral bus 38 when encapsulating the response data. This interconnect address is read from the mapping entry in distributed routing table 47, and identifies interconnect interface device 44 for the processing node that sent the request.

When CPU 42 boots, it sends out a memory read command with an address that normally maps to BIOS. However CPU 42 has no local BIOS. Instead, interconnect interface device 44 intercepts this memory command, encapsulates it, and sends it over interconnect fabric 40 to device manager 50. Device manager 50 extracts the read command, and sends it to BIOS 24 on first peripheral bus 38. BIOS 24 reads the booting instructions at the indicated address and sends the instructions to device manager 50, which encapsulates the instructions, and sends them over interconnect fabric 40 to interconnect interface device 44. The instructions are extracted by interconnect interface device 44 and sent to CPU 42 for execution or storage in DRAM 41.

Figure 4:
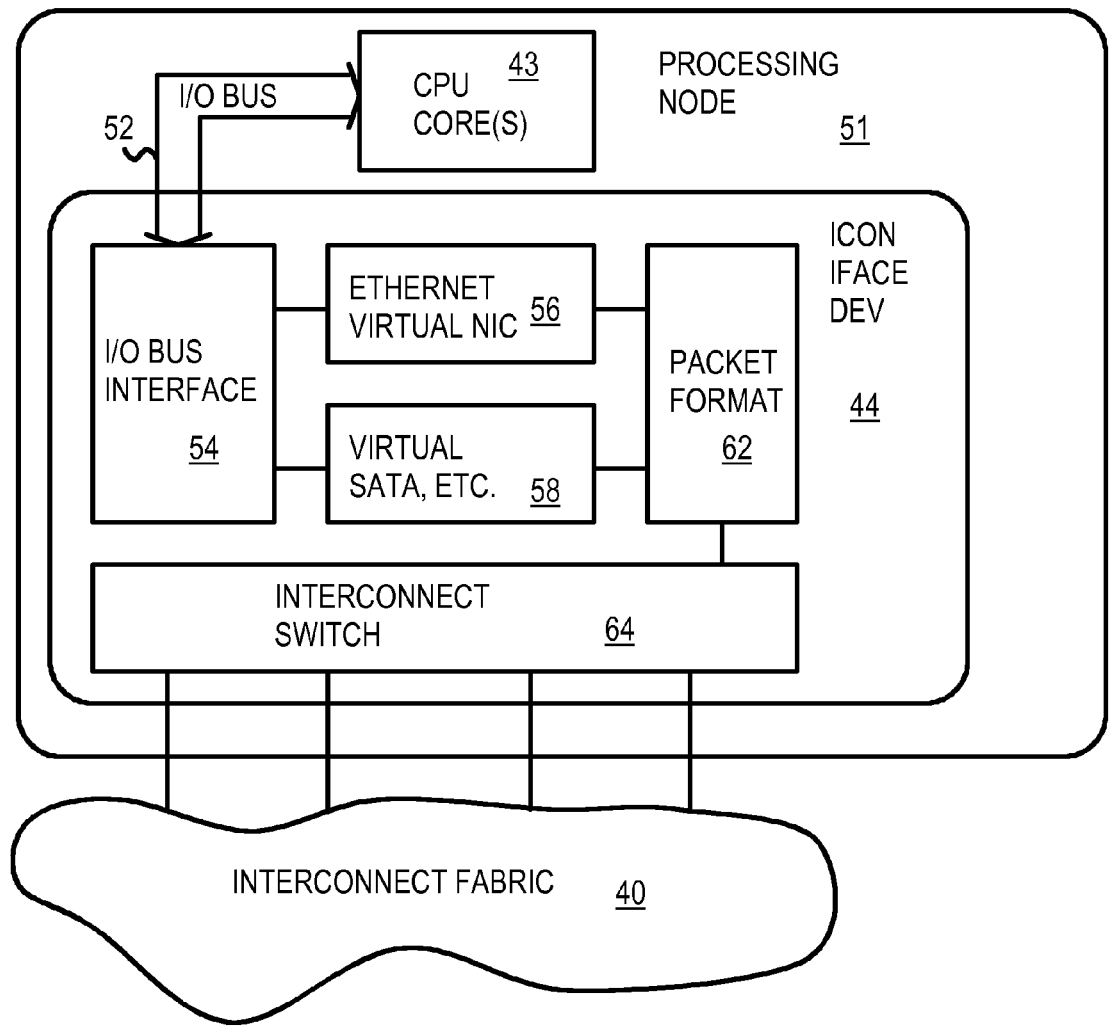
FIG. 4 highlights a processing node connected to an interconnect fabric to virtualize remote peripherals.

FIG. 4 highlights a processing node connected to an interconnect fabric to virtualize remote peripherals. Processing node 51 may include one or more processors 43, each with one or more CPU cores and local DRAM acting as its main memory. Rather than connect to local and remote peripherals, CPU cores in processor 43 connect through local I/O bus 52 to I/O bus interface 54, which responds to all local I/O bus requests, acting as a virtual endpoint for each local CPU core in processor 43. The software or operating systems in processor 43 do not have to be modified, since I/O bus interface 54 intercepts requests addressed to virtualized peripherals that appear to be on local I/O bus 52. The hardware of I/O bus interface 54 responds to the requests just as a local peripheral would, even though the peripheral is remotely located. Wait states may be added to account for increased delays in reaching the remote peripherals through interconnect fabric 40.

I/O bus interface 54 provides the physical interfaces to I/O bus 52, while the higher-level responses are generated by virtual Ethernet NIC 56 and by virtual generic peripheral 58. Requests sent over I/O bus 52 for an Ethernet peripheral are routed by I/O bus interface 54 to virtual Ethernet NIC 56, while all other requests are routed by I/O bus interface 54 to virtual generic peripheral 58.

Many requests require data obtained from the actual remote peripheral. These requests are forwarded by virtual Ethernet NIC 56 or virtual generic peripheral 58 to packet formatter 62, which encapsulates the request. The interconnect address of device manager 50 is obtained by interconnect interface device 44 looking up the local address from I/O bus 52 in distributed routing table 46 (FIG. 3). This interconnect address is added to the packet by packet formatter 62, and the packet is sent to local interconnect switch 64.

Local interconnect switch 64 may connect to several dimensions of connections inside interconnect fabric 40. A low-order dimension may be used when connecting to a nearby device manager 50, while higher-order dimensions may be used when connecting to more remotely located device managers 50. The higher-order dimensions may require a longer path through interconnect fabric 40 with several intermediate connections, while a lower-order dimension may make a direct connection.

Figure 5:
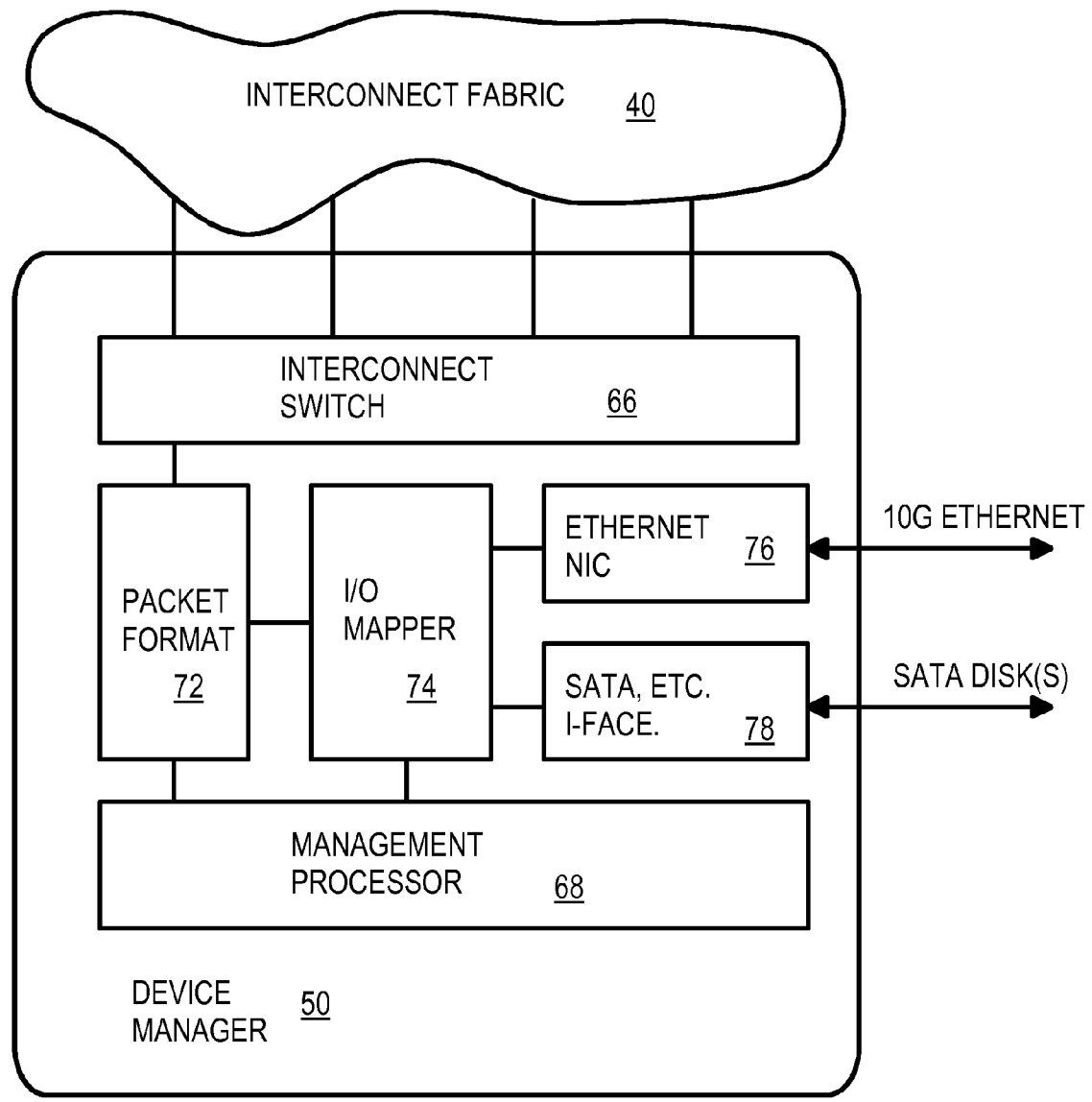
FIG. 5 highlights a device manager for connecting to remote peripherals on a remote peripheral bus.

FIG. 5 highlights a device manager for connecting to remote peripherals on a remote peripheral bus. Device interconnect switch 66 may connect to several dimensions of connections inside interconnect fabric 40. Packets received over interconnect fabric 40 are compared to the interconnect address of device manager 50 and processed when the address matches the interconnect address of device manager 50.

Management processor 68 uses I/O mapper 74 to examine incoming packets and routes the encapsulated request to either remote Ethernet NIC 76 or to remote generic peripheral 78. I/O mapper 74 can access distributed routing table 47 (FIG. 3) to search for a matching mapping entry, or to create a new mapping entry for a new request.

Rather than have an external peripheral bus 38 (FIG. 3), remote Ethernet NIC 76 can be directly accessed within device manager 50, and can connect to an external network such as a 10G Ethernet link. Likewise, remote generic peripheral 78 can be directly accessed within device manager 50 rather than be located on an external peripheral bus. Remote generic peripheral 78 can directly connect to external hard disks using a SATA bus, or to other peripherals such as a console or BIOS using an external peripheral bus such as a SATA bus that is shared with the hard disks.

Data read from hard disks by remote generic peripheral 78 or from the Ethernet link by remote Ethernet NIC 76 are encapsulated by packet formatter 72 and have the interconnect address of interconnect interface device 44 for the requesting processing node attached using I/O mapper 74. The encapsulated data is sent over interconnect fabric 40 using device interconnect switch 66.

Figure 6:
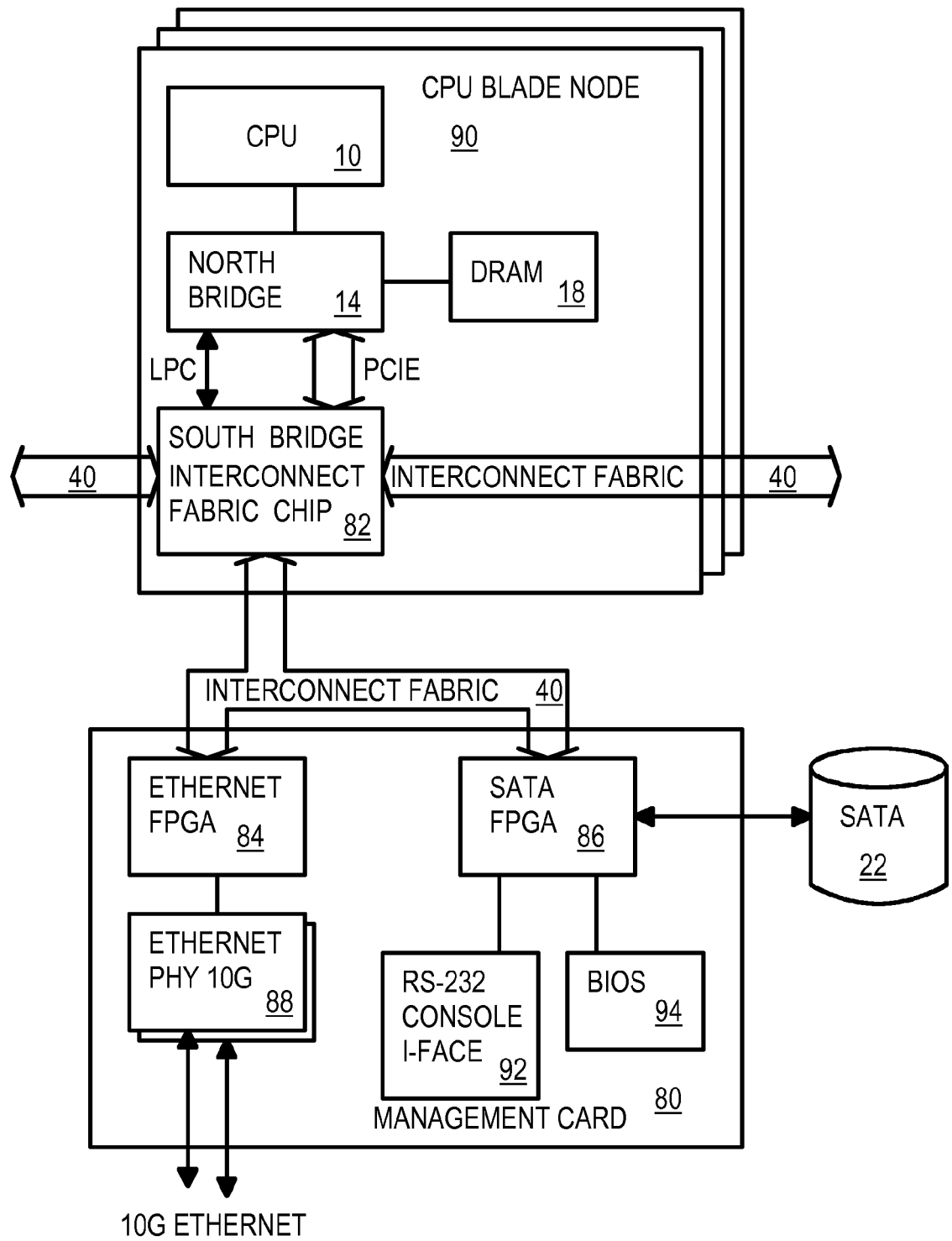
FIG. 6 shows a multi-processor system that shares remote peripheral on a management card through an interconnect fabric.

FIG. 6 shows a multi-processor system that shares remote peripheral on a management card through an interconnect fabric. Several processor nodes share virtualized peripherals located on management card 80.

Interconnect fabric 40 connects to one or more of management card 80. Management card 80 contains one or more Field-Programmable Gate Array (FPGA) chips. Requests are extracted from interconnect packets and are routed to either remote Ethernet FPGA 84 or to SATA FPGA 86, depending on the packet's type field.

Ethernet requests are extracted from the data payloads of Ethernet request packets sent to Ethernet FPGA 84. These Ethernet requests are forwarded to Ethernet controller 88, which reformats requests and sends Ethernet packet through a physical layer that connects to a 10 Giga-bits-per-second Ethernet link. There may be several Ethernet links and controllers connected to Ethernet FPGA 84 when many processor cores share management card 80.

Other types of interconnect packets are sent to SATA FPGA 86. SATA FPGA 86 extracts requests embedded in the data payloads and forwards the requests to the remote peripheral device indicated by the packet type field, or by information in the data payload such as a device address from the processor core, or by the mapping entry from distributed routing table 47 (FIG. 3).

Requests for accessing a hard disk are sent as SATA or IDE requests to hard disks 22. There may be several sub-commands that are sent over a SATA bus to hard disk 22, such as commands to seek a sector, read or write data in that sector, program registers in the hard disk's controller, etc.

Requests for reading or writing the console are sent from SATA FPGA 86 to console interface 92, which may have registers that are written to drive data onto an external serial line, such as a RS-232 interface. Incoming data may be read from the console registers in console interface 92. An external display, storage device, or monitoring host computer may connect to the other end of the RS-232 interface to monitor the multi-processor system.

Requests to read the remote BIOS are converted by SATA FPGA 86 into signals for performing a memory read of remote BIOS 94. An address within BIOS 94 may be generated along with control signals such as a read strobe or output enable signal. The data read from BIOS 94 is encapsulated into an interconnect packet by SATA FPGA 86, and the source interconnect address of management card 80 and the destination interconnect address of the requesting processing node are added by SATA FPGA 86 consulting distributed routing table 47 (FIG. 3).

Data returned over interconnect fabric 40 in interconnect packets are routed through south bridge interconnect fabric chip 82, which contains switches that form part of interconnect fabric 40. South bridge interconnect fabric chip 82 also contains interconnect interface device 44 16 (FIG. 3) and portions of a south bridge. South bridge interconnect fabric chip 82 may connect in several dimensions of the fabric to other south bridge interconnect fabric chips 82 on other CPU blade node cards 90, and then through the other south bridge interconnect fabric chips 82 (not shown) to other management cards 80 (not shown).

South bridge interconnect fabric chip 82 may be located on one of several CPU blade node cards 90 that are connected together through south bridge interconnect fabric chip 82. Thus many CPU's may share one south bridge interconnect fabric chip 82. Each CPU has a separate PCI Express (PCIE) bus that connects to south bridge interconnect fabric chip 82. Alternately, each CPU blade node card 90 may have one south bridge interconnect fabric chip 82 mounted thereon.

CPU 10 on CPU blade node card 90 reads instructions and accesses data in DRAM 18 through north bridge 14. When CPU 10 accesses a peripheral, it sends a request through north bridge 14 over a PCIE bus to south bridge interconnect fabric chip 82. South bridge interconnect fabric chip 82 acts as a south bridge chip, but instead of directly connecting to a local peripheral bus, south bridge interconnect fabric chip 82 encapsulates the requests from CPU 10 into interconnect packets, that are sent over interconnect fabric 40 to management card 80. Management card 80 then accesses a remote peripheral and sends a response such as data back through interconnect fabric 40 to the requesting south bridge interconnect fabric chip 82. The data read from the remote peripheral is extracted from the interconnect packet by south bridge interconnect fabric chip 82 and sent to CPU 10 through north bridge 14.

A Low Pin Count (LPC) bus may also connect north bridge 14 or CPU 10 and south bridge interconnect fabric chip 82. The LPC bus may be used for out-of-channel signaling, setup, and control of south bridge interconnect fabric chip 82.

Figure 7:
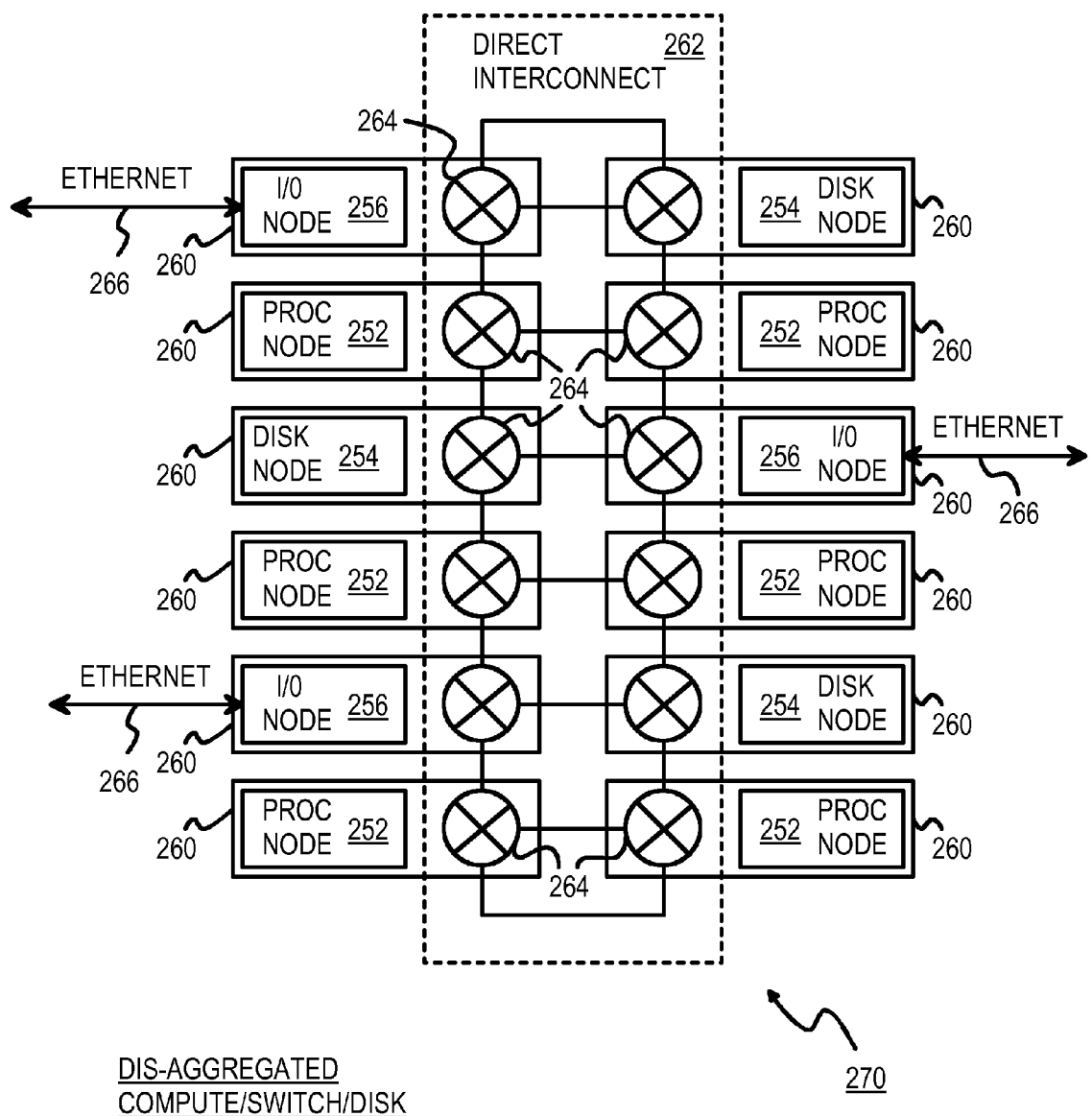
FIG. 7 shows a dis-aggregated compute/switch/disk chassis with a direct interconnect fabric.

Dis-Aggregated Chassis—FIG. 7

FIG. 7 shows a dis-aggregated compute/switch/disk chassis with a direct interconnect fabric. Dis-aggregated compute/switch/disk chassis 270 has slots or rack locations that accept many modules or node cards 260. Each node card 260 includes one or more of: processing nodes 252, disk nodes 254, and I/O nodes 256 and direct interconnect switch 264. Direct interconnect switch 264 on node card 260 is connected to other direct interconnect switches 264 to form direct interconnect fabric 262.

Direct interconnect fabric 262 may include several PCB's of interconnect traces that are located within dis-aggregated compute/switch/disk chassis 270 and connect to connector sockets that receive node cards 260.

Node cards 260 may have different form factors for each type of card. For example, node card 260 may have an elongated form factor for processing nodes 252, but a smaller form factor for disk nodes 254. Node cards 260 may have a mid-sized form factor for I/O nodes 256. Each node card 260 may be a printed-circuit board (PCB) with a connector edge that fits into a connector socket on a chassis.

I/O nodes 256 contain a LAN switch that connects to Ethernet link 266. Ethernet link 266 connects to another dis-aggregated compute/switch/disk chassis 270 or to a core switch. In this example, dis-aggregated compute/switch/disk chassis 270 has three Ethernet links 266.

Disk nodes 254 contain databases and other files that are accessed by processing nodes 252. Processing nodes 252 include multiple CPU's that run server software to respond to client requests received over the network.

Direct interconnect fabric 262 can be interconnect fabric 40 of FIGS. 3-6. Processing node 252 corresponds to processing node 51 of FIG. 4, with interconnect switch 64 acting as direct interconnect switch 264. Disk node 254 and I/O node 256 correspond to subsets of device manager 50 of FIG. 5, with interconnect switch 66 acting as direct interconnect switch 264. In the embodiment of FIG. 6, CPU blade node 90 corresponds to processing node 252 with south bridge interconnect fabric chip 82 acting as direct interconnect switch 264 for three cards 260: processing node 252, disk node 254, and I/O node 256. Disk node 254 and I/O node 256 correspond to subsets of management card 80 of FIG. 6. Other partitionings and embodiments are possible.

Thus many processing nodes 252, I/O nodes 256, and/or disk nodes 254 can be stacked together on one chassis and connected together by direct interconnect fabric 262. Rather than aggregating all processing nodes together onto on chassis, and all switches onto another chassis, and all storage nodes onto another chassis, all three kinds of nodes are stacked together in the same chassis.

Figure 8:
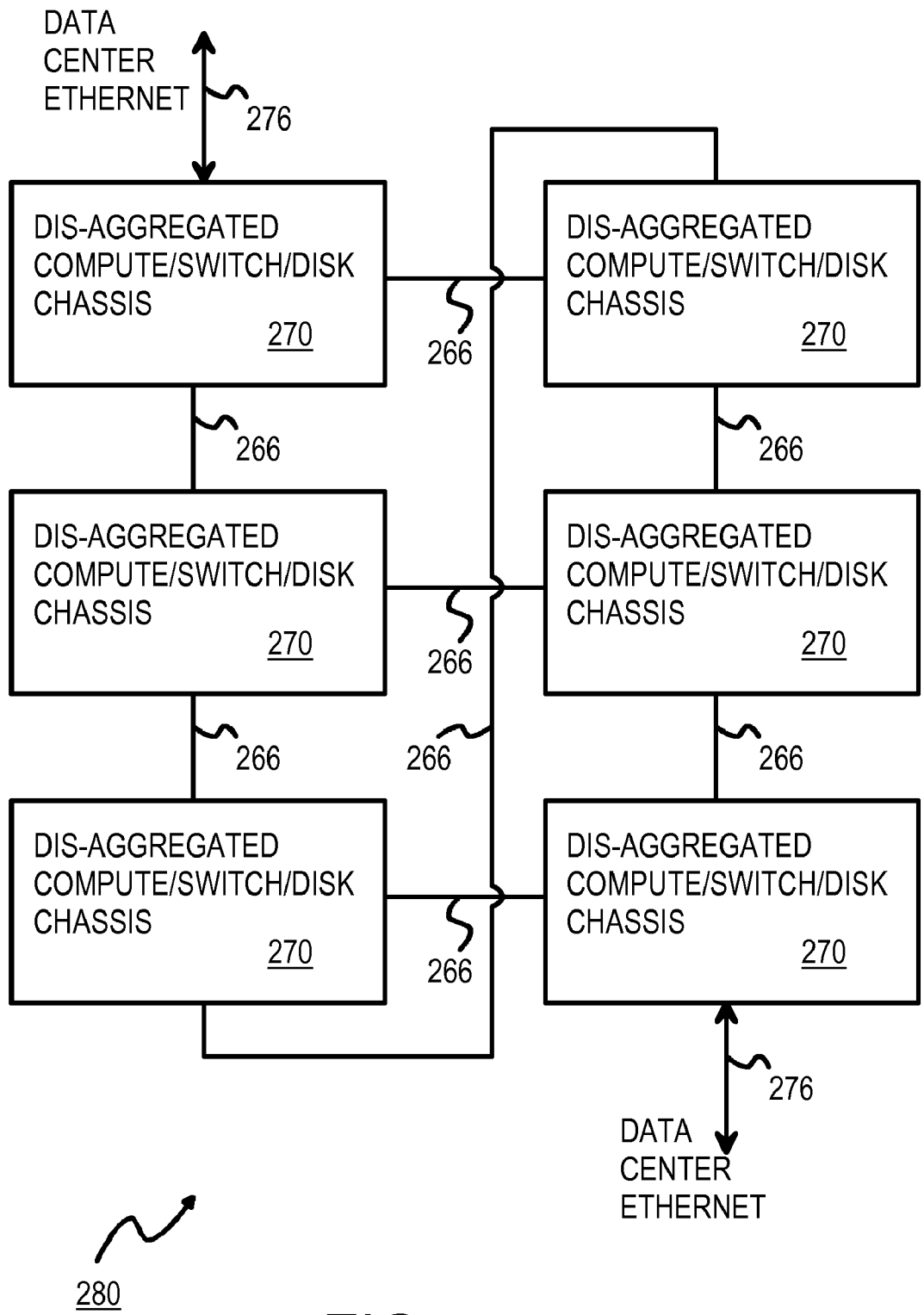
FIG. 8 shows several dis-aggregated compute/switch/disk chassis connected together to form a dis-aggregated data cluster.

Dis-Aggregated Data Cluster—FIG. 8

FIG. 8 shows several dis-aggregated compute/switch/disk chassis connected together to form a dis-aggregated data cluster. Dis-aggregated data cluster 280 contains six dis-aggregated compute/switch/disk chassis 270 (FIG. 7). Four dis-aggregated compute/switch/disk chassis 270 have three Ethernet links 266 that connect to 3 other dis-aggregated compute/switch/disk chassis 270. Two other dis-aggregated compute/switch/disk chassis 270 connect to only 2 other dis-aggregated compute/switch/disk chassis 270 and to data-center Ethernet link 276. Thus dis-aggregated data cluster 280 has six dis-aggregated compute/switch/disk chassis 270 and two data-center Ethernet links 276.

Rather than have a single trunk arrangement, Ethernet links 266 form a mesh, since each dis-aggregated compute/switch/disk chassis 270 can connect to 2 or 3 other dis-aggregated compute/switch/disk chassis 270. The mesh arrangement of Ethernet links 266 provides redundancy and avoids a single point of failure, such as a broken trunk line.

Figure 9:
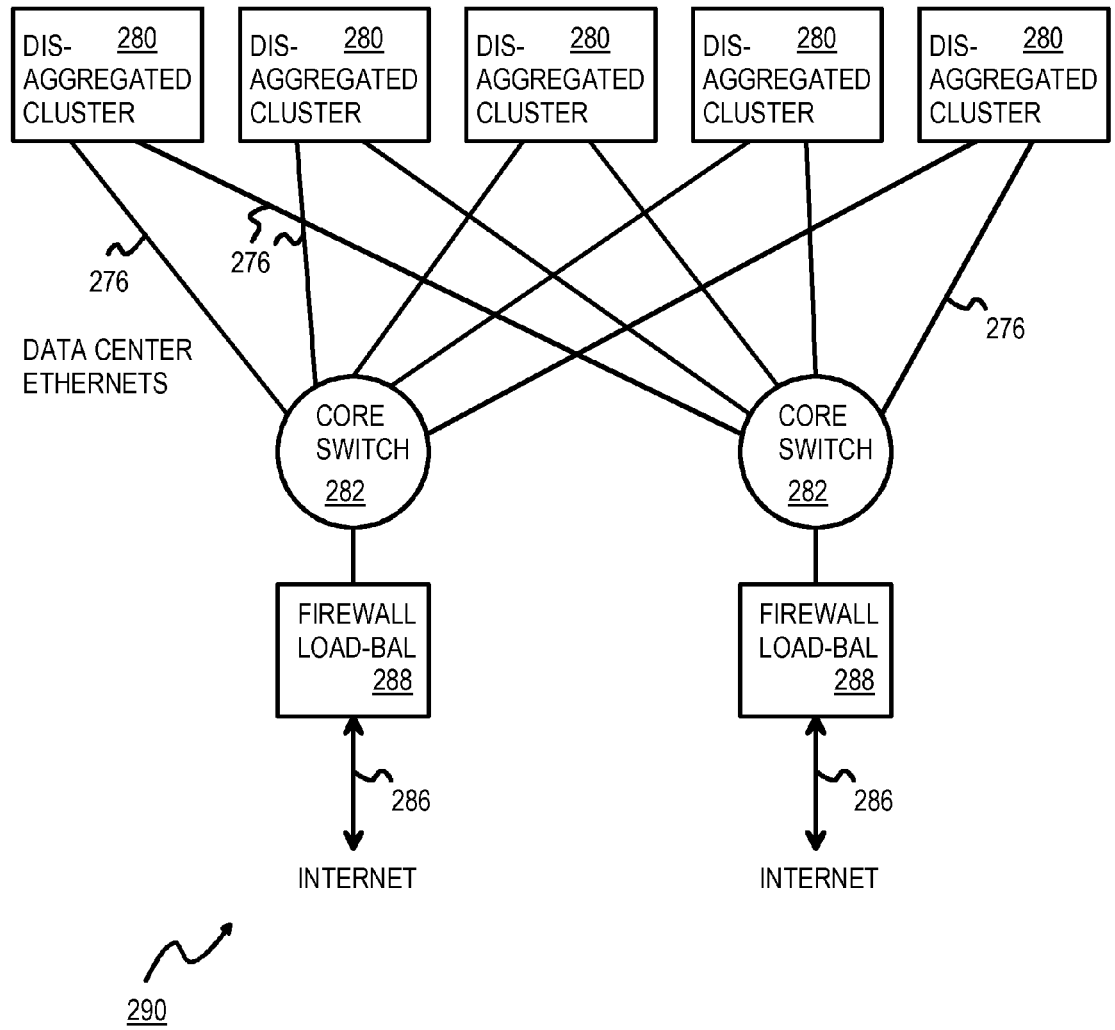
FIG. 9 shows several dis-aggregated data clusters connected together by core switches to form a dis-aggregated data center.

Dis-Aggregated Data Center—FIG. 9

FIG. 9 shows several dis-aggregated data clusters connected together by core switches to form a dis-aggregated data center. Dis-aggregated data center 290 contains five dis-aggregated data clusters 280 (FIG. 9) in this example. Each dis-aggregated data cluster 280 has two external links, data-center Ethernet links 276, that connect to both of core switches 282. Each core switch 282 is an Ethernet switch with an external link that connects to Internet 286 through firewall and load-balancer 288, which acts as a gateway device. Core switch 282 contains Ethernet or other Local-Area-Network (LAN) switches and routers that connect to dis-aggregated data clusters 280 and to firewall and load-balancer 288. Firewall and load-balancer 288 has a load-balancer to distribute incoming client requests among servers running in processing nodes 252 in dis-aggregated data cluster 280. Firewall or other gateway programs may be running on firewall and load-balancer 288. The firewall can block unauthorized incoming traffic from the external network.

Redundancy is provided by connecting each dis-aggregated data cluster 280 to two core switches 282. This redundancy allows each dis-aggregated data cluster 280 to continue to operate even if one Internet connection should fail.

Figure 10:
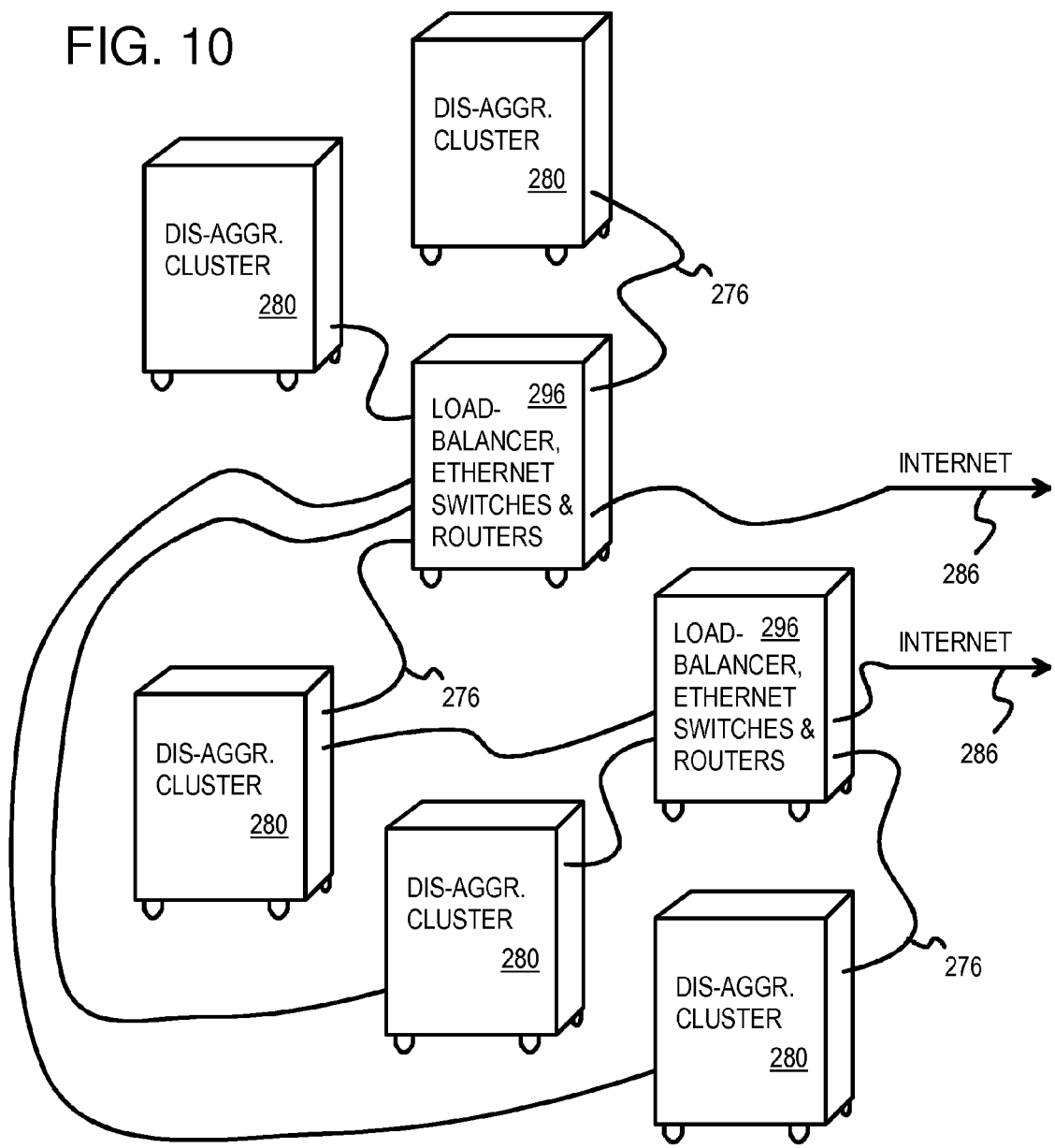
FIG. 10 shows a data center formed by multiple dis-aggregated data clusters.

FIG. 10 shows a data center formed by multiple dis-aggregated data clusters. Dis-aggregated data clusters 280 (FIG. 8) are connected by data-center Ethernet links 276 to gateway chassis 296. Gateway chassis 296 includes core switch 282 and firewall and load-balancer 288 of FIG. 9, and connect to Internet 286.

Each dis-aggregated data cluster 280 connects to both gateway chassis 296, providing a redundant connection to Internet 286. A single kind of chassis may be used, reducing cost and complexity. The flatter hierarchy can reduce packet and message delays, since fewer switches are passed through.

Figure 11:
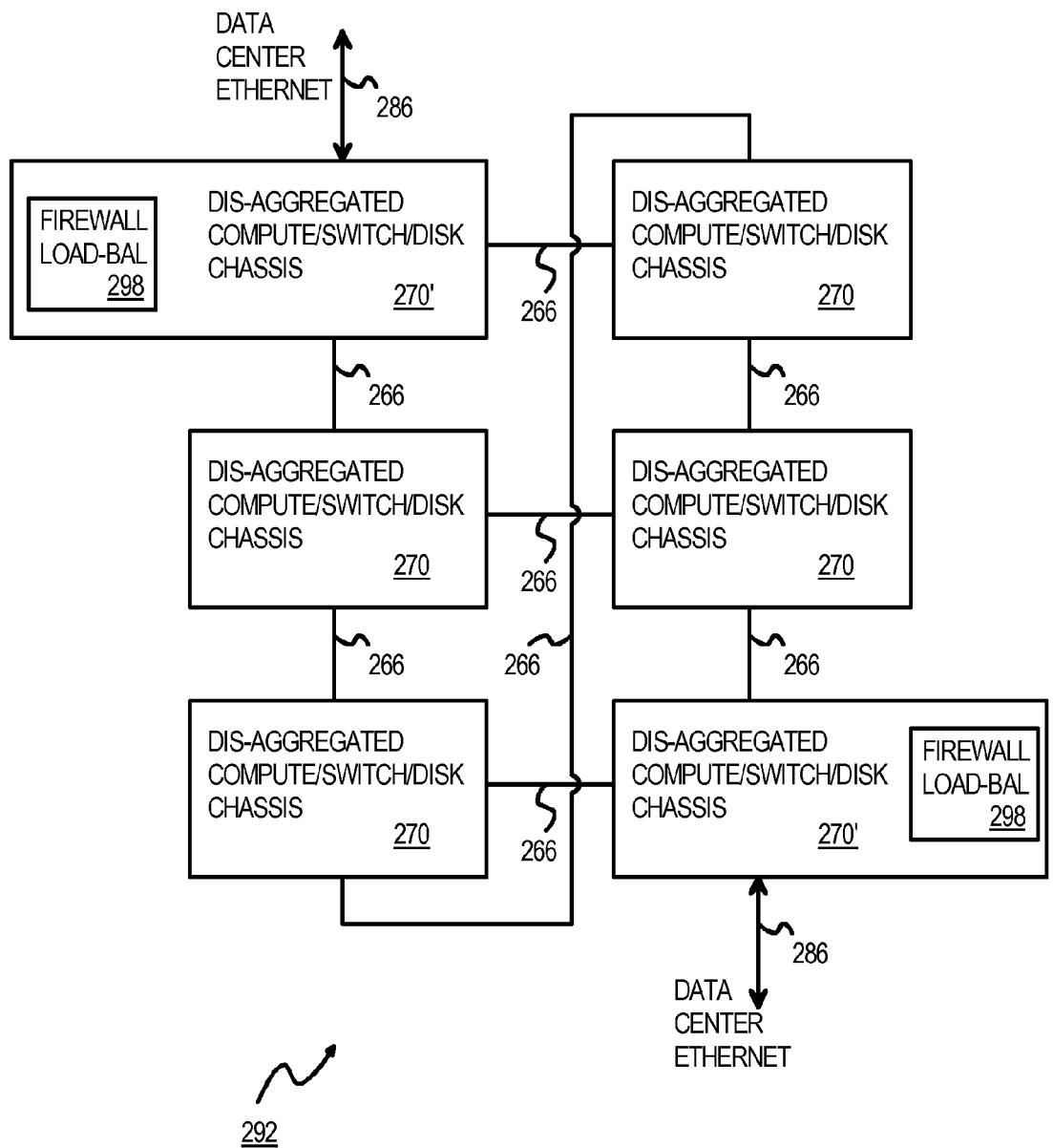
FIG. 11 is an alternate embodiment of several dis-aggregated compute/switch/disk chassis connected together to form a dis-aggregated data cluster.
Figure 12:
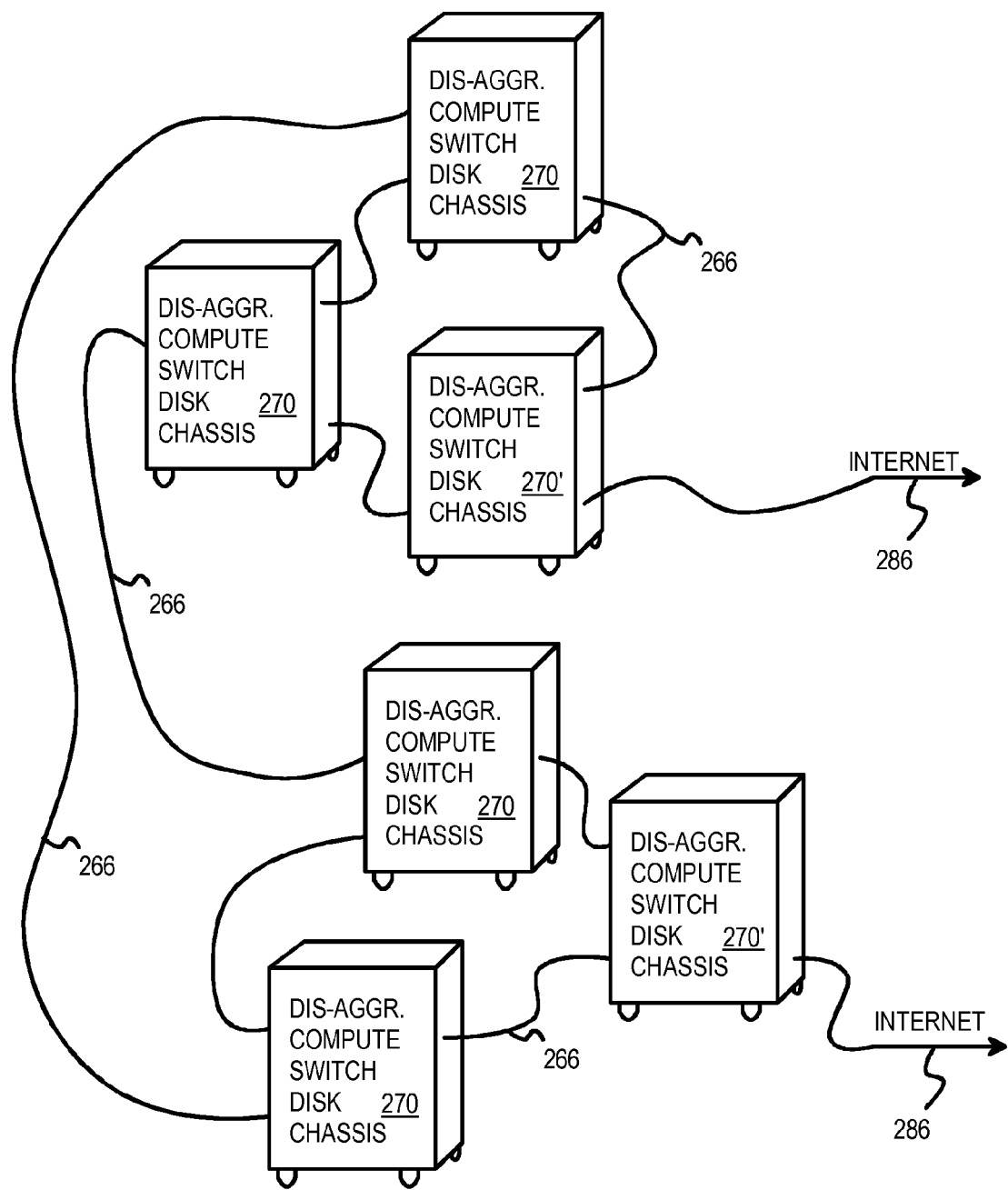
FIG. 12 shows an alternate embodiment of a data center formed by multiple dis-aggregated data clusters.

Modified Dis-Aggregated Compute/Switch/Disk Chassis—FIGS. 11-12

FIG. 11 is an alternate embodiment of several dis-aggregated compute/switch/disk chassis connected together to form a dis-aggregated data cluster. Dis-aggregated data cluster 292 contains six dis-aggregated compute/switch/disk chassis 270 (FIG. 7). Four dis-aggregated compute/switch/disk chassis 270 have three Ethernet links 266 that connect to 3 other dis-aggregated compute/switch/disk chassis 270. Two modified dis-aggregated compute/switch/disk chassis 270' connect to only 2 other dis-aggregated compute/switch/disk chassis 270 and to Internet 286.

Modified dis-aggregated compute/switch/disk chassis 270' include firewall and load-balancer 298. Thus the external links from modified dis-aggregated compute/switch/disk chassis 270' can connect directly to Internet 286. Core switches 282 of FIG. 9 are deleted, reducing cost.

FIG. 12 shows an alternate embodiment of a data center formed by multiple dis-aggregated data clusters. Dis-aggregated compute/switch/disk chassis 270 (FIG. 7) are connected by Ethernet links 266 to modified dis-aggregated compute/switch/disk chassis 270'. Modified dis-aggregated compute/switch/disk chassis 270' includes firewall and load-balancer 298. Thus the external links from modified dis-aggregated compute/switch/disk chassis 270' can connect directly to Internet 286. Core switches 282 of FIG. 9 are deleted, reducing cost.

Alternate Embodiments

Several other embodiments are contemplated by the inventors. For example, dis-aggregated data cluster 280 may contain a different number of dis-aggregated compute/switch/disk chassis 270 than the six shown in the example of FIG. 8. Likewise, each dis-aggregated compute/switch/disk chassis 270 may contain different numbers and arrangements of disk nodes 254, I/O nodes 256, and processing nodes 252. For example, a dis-aggregated compute/switch/disk chassis 270 that is about one cubic meter in size may contain slots for up to 64 processing nodes 252, 16 disk nodes 254, and 8 I/O nodes 256. Each disk node 254 may be a disk controller card that can control four disk drive units, and each I/O node 256 can connect to 2 Ethernet links. Each processing node 252 may have four CPU's. Many other arrangements, configurations, and combinations are possible.

The elimination of the aggregated switching can be done for a cluster, rack, row of racks or entire data center level. A data center can choose to disaggregate the switching at any granularity and then incrementally increase the switching disaggregation over time until the entire data center uses disaggregated switching. While rack mounted servers have been described, blade servers may also benefit from the invention.

A load balancer could be located inside of a disaggregated cluster instead of at a disaggregated data center. This could allow for a load balancing layer of a large number of smaller components instead of one large component. A core router could be part of firewall and load-balancer 288.

Various operating systems could be run on the CPU's on processing nodes 252, such as Windows, Linux, etc. Some CPU's may run one OS, while other CPU's may run another OS. While disk drives have been described for disk nodes 254, other storage media could be substituted, such as flash-memory drives, optical drives, tape drives, etc.

Several instances of dis-aggregated data cluster 280 may be located together in a single location or may be remote from each other and connected by Internet 286, which can be the Internet or another network such as a virtual-private network (VPN), an Intranet, leased trunk lines, or other kinds of network.

The first level of the fabric hierarchy, direct interconnect fabric 262, is effectively used as a switch for the second and succeeding levels of the hierarchy. This eliminates the need for rack switches 222 and aggregation switches 232. With direct interconnect fabric 262, the switching is distributed both within a server box or chassis as well as across server boxes or chassis. Furthermore, the switching function of direct interconnect fabric 262 is distributed to each processing node.

Special drivers for accessing the remote peripherals do not need to be run on the local CPU's. There may be some software on the local CPU to control switches in interconnect fabric 40 or south bridge interconnect fabric chip 82, but this software is not activated when accessing remote peripherals. Thus access of remote peripherals is fast and transparent to applications and the operating system running on the local CPU.

The local peripheral bus between north bridge 14 and south bridge interconnect fabric chip 82 may be a PCI bus, a PCIE bus, an AT bus, a SATA bus, Serial Peripheral Interface (SPI), $I^2C$ bus, SM bus, IDE bus, SAS, proprietary bus, or other bus. Likewise, the remote peripheral bus may be a PCI bus, a PCIE bus, an AT bus, a SATA bus, Serial Peripheral Interface (SPI), $I^2C$ bus, SM bus, IDE bus, SAS, proprietary bus, or other kind of expansion bus. Some device managers 50 may connect to one kind of peripheral bus, such as PCIE, while other device managers 50 may connect to other kinds of peripheral buses, such as USB. Some device managers 50 may have multiple bus controllers, and be able to access several buses of different protocols. Multiple channels and simultaneous access of multiple buses may be supported by some device managers 50. A large system may have hundreds or thousands of CPU's and shared peripherals.

Rather than have one remote peripheral bus 38 per device manager 50, there may be several remote buses, such as shown in FIG. 5, where the SATA and Ethernet controllers have separate buses to I/O mapper 74.

Various kinds of bus links could be used within interconnect fabric 40. High-speed serial links in interconnect fabric 40 may be PCIE, Rapid 10, Rocket 10, Hyper-Transport, or some other protocol, and future protocols and enhancements may be substituted. The interconnect fabric may have one dimension or may have multiple dimensions. The interconnect fabric may be a hyper-cube, a torus, and multi-dimensional torus, a tree, a fat tree, or a generalized hypercube, or some other topology. Interconnect packets may have additional fields and may vary in format.

Remote peripherals may include hard disks or solid state devices such as SATA/SAS or IDE disks, Ethernet NIC's, BIOS memory with boot code or some other code or data, consoles, fiber channel disks and connections, shared clean memory pages, serial COM devices, virtual USB devices, etc. A wide variety of peripherals may be virtualized using the invention. Rather than simply virtualizing one kind of peripheral, such as only Ethernet or only BIOS, the invention generically virtualizes a wide variety of peripheral devices in a consistent way. Thus the invention can expand to include new peripherals devices that are developed in the future, increasing the lifetime of the system. The system with virtualized peripherals does not become obsolete when new peripherals are developed. Even new peripheral buses may be supported by adding a new device manager 50 for that new peripheral bus to an older system.

Some local peripherals could be allowed on the local peripheral bus, and south bridge interconnect fabric chip 82 may have some local peripherals, such as a real time clock, timers, DMA, etc. Plug-in peripherals may not be supported for the local processor cores, or may be used only for testing or monitoring, such as by having a plug on the local peripheral bus for use during diagnostic testing.

While 10 G Ethernet has been described, other Ethernets could be used, such as 100M, 10M, or future Ethernets such as 40 G or 100 G. Rather than use Ethernet, other types of networks could be substituted, such as FiberChannel or Data Center Ethernet (DCE), or a generalized network interface controller (NIC) may be used. A multi-network controller could also be used. A security interface could also be used.

In general, BIOS and console requests could go to either FPGA or even to a separate chip. Alternately, all of these blocks could be put in one chip.

Rather than use FPGA chips, other kinds of logic could be used, such as custom-logic chips, mask-programmable gate arrays, Application-Specific Integrated Circuits (ASICs), gate arrays, programmable logic, etc. Ethernet FPGA 84 and SATA FPGA 86 could be combined into one large chip, or may be divided into separate chips or combined with other function chips. While a 4-port connection to south bridge interconnect fabric chip 82 has been described, more or less than 4 ports, such as 7 ports, 8 ports, etc could be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dis-aggregated compute/switch/storage chassis comprising:
   a plurality of node cards;
   a plurality of slots having sockets for receiving the plurality of node cards;
   a direct interconnect fabric having wiring traces that connect to the plurality of node cards through the plurality of slots;
   processing nodes on a first subset of the plurality of node cards, the processing nodes each having multiple processors for executing programs and for generating requests to access peripherals;
   storage nodes on a second subset of the plurality of node cards, the storage nodes each for connecting to storage media;
   Input-Output I/O nodes on a third subset of the plurality of node cards, the I/O nodes each having a network interface controller (NIC) for connecting to a local-area network (LAN) link;
   wherein the first subset of the plurality of node cards is non-overlapping with the second subset and with the third subset of the plurality of node cards; and
   a direct interconnect switch on each of the plurality of node cards, for connecting through the direct interconnect fabric to other direct interconnect switches on other node cards.

2. The dis-aggregated compute/switch/storage chassis of claim 1 further comprising:
   a dis-aggregated data cluster which comprises a plurality of the dis-aggregated compute/switch/storage chassis that are connected together by LAN links from the I/O nodes;
   wherein the third subset comprises at least three I/O nodes for connecting to at least three LAN links;
   wherein each dis-aggregated compute/switch/storage chassis in the dis-aggregated data cluster connects to at least two other dis-aggregated compute/switch/storage chassis in the plurality of dis-aggregated compute/switch/storage chassis;
   wherein the plurality of dis-aggregated compute/switch/storage chassis in the dis-aggregated data cluster are connected together by a mesh of the LAN links.

3. The dis-aggregated compute/switch/storage chassis of claim 2 further comprising:
   a first data-center LAN link in the dis-aggregated data cluster, wherein the first data-center LAN link is one of the LAN links that does not connect to LAN links for other dis-aggregated compute/switch/storage chassis;
   a plurality of the dis-aggregated data clusters;
   a first core switch; and
   a first gateway for connecting to an external network;
   wherein the first core switch is coupled to the first data-center LAN link for each dis-aggregated data cluster in the plurality of the dis-aggregated data clusters;
   wherein the first core switch is also coupled to the first gateway.

4. The dis-aggregated compute/switch/storage chassis of claim 3 wherein the first gateway further comprises:
   a firewall for blocking unauthorized incoming traffic from the external network; and
   a load-balancer for distributing incoming requests from the external network among the processing nodes in the plurality of dis-aggregated compute/switch/storage chassis.

5. The dis-aggregated compute/switch/storage chassis of claim 4 further comprising:
   a load-balancer for distributing incoming requests from the external network among the processing nodes in the plurality of dis-aggregated compute/switch/storage chassis;
   a first data-center LAN link in the modified dis-aggregated compute/switch/storage chassis, wherein the first data-center LAN link is one of the LAN links that does not connect to LAN links for other dis-aggregated compute/switch/storage chassis;
   wherein the third subset comprises at least three I/O nodes for connecting to at least three LAN links;
   wherein each dis-aggregated compute/switch/storage chassis connects to at least three other dis-aggregated compute/switch/storage chassis in the plurality of dis-aggregated compute/switch/storage chassis;

wherein the modified dis-aggregated compute/switch/storage chassis connects to at least two other dis-aggregated compute/switch/storage chassis in the plurality of dis-aggregated compute/switch/storage chassis and to the external network;

wherein the plurality of dis-aggregated compute/switch/storage chassis and the modified dis-aggregated compute/switch/storage chassis are connected together by a mesh of the LAN links.

6. The dis-aggregated compute/switch/storage chassis of claim 3 wherein the storage media comprises a plurality of disk drives or flash memory and wherein the LAN links are Ethernet links.

7. The dis-aggregated compute/switch/storage chassis of claim 3 wherein each processing node comprises at least four Central Processing Units (CPUs);
   wherein the first subset comprises at least eight processing nodes;
   wherein the second subset comprises at least three storage nodes;
   wherein the third subset comprises at least three I/O nodes;
   wherein the dis-aggregated data cluster comprises at least six dis-aggregated compute/switch/storage chassis.

8. The dis-aggregated compute/switch/storage chassis of claim 1 further comprising:
   a plurality of the dis-aggregated compute/switch/storage chassis that are connected together by the LAN links from the I/O nodes;
   a modified dis-aggregated compute/switch/storage chassis which comprises:
      a dis-aggregated compute/switch/storage chassis;
      a firewall for blocking unauthorized incoming traffic from an external network; and
   whereby the remote peripherals are accessed remotely through the direct interconnect fabric and virtual endpoints appear to be on the local peripheral bus from the point of view of software executing on the processor.

9. The dis-aggregated compute/switch/storage chassis of claim 8 wherein each of the processing nodes further comprises:
   a main memory for storing instructions executed and data used by a processor of the multiple processors;
   a local peripheral bus that carries the requests to access peripherals;
   an interconnect interface device, coupled to the processor, for acting as a virtual endpoint for the requests to access peripherals from the processor, wherein the virtual endpoints appear to be on the local peripheral bus from a point of view of software executing on the processor;
   wherein the storage nodes and the I/O nodes comprise remote peripherals,
   a second data-center LAN link in the dis-aggregated data cluster, wherein the second data-center LAN link is one of the LAN links that does not connect to LAN links for other dis-aggregated compute/switch/storage chassis;
   a second core switch; and
   a second gateway for connecting to an external network;
   wherein the second core switch is coupled to the second data-center LAN link for each dis-aggregated data cluster in the plurality of the dis-aggregated data clusters;
   wherein the second core switch is also coupled to the second gateway.

10. The dis-aggregated compute/switch/storage chassis of claim 9 wherein the direct interconnect fabric carries interconnect packets containing the requests to access peripherals generated by the multiple processors on the processing nodes;
   wherein the I/O nodes and the storage nodes each comprise:
      a remote peripheral bus that connects to a remote peripheral, the remote peripheral being a network interface controller (NIC) or a storage media controller;
      a device manager, coupled to the direct interconnect fabric, for sending the requests to access peripherals contained in the interconnect packets over the remote peripheral bus to the remote peripheral, and for receiving reply data from the remote peripheral and sending the reply data in interconnect packets over the direct interconnect fabric to the interconnect interface device on the processing node to respond to the requests to access peripherals.

11. The dis-aggregated compute/switch/storage chassis of claim 10 further comprising:
   a distributed routing table coupled to the interconnect interface device, the distributed routing table storing mapping entries, the mapping entries containing mappings of local addresses on the local peripheral bus to interconnect addresses that identify the device manager coupled to the remote peripheral buses attached to the remote peripheral that is virtually addressed by the request to access peripherals.

12. The dis-aggregated compute/switch/storage chassis of claim 11 further comprising:
   a device distributed routing table coupled to the device manager, the device distributed routing table storing return mapping entries, the return mapping entries each identifying a requesting interconnect interface device that is coupled to the processor generating a request received by the device manager.

13. A dis-aggregated data cluster comprising:
   a plurality of dis-aggregated chassis, each dis-aggregated chassis comprising:
      a direct interconnect fabric having interconnect that connects to node cards;
      processing nodes each having a plurality of processors for executing instructions;
      storage nodes for controlling storage media that stores files;
      Input/Output I/O nodes each having a network interface controller (NIC) for connecting to a network link;
      wherein the I/O nodes comprise a first I/O node for connecting to a first local network link, a second I/O node for connecting to a second local network link, and a third I/O node for connecting to a third local network link;
      wherein the processing nodes are formed on a first form factor of the node cards;
      wherein the storage nodes are formed on a second form factor of the node cards;
      wherein the I/O nodes are formed on a third form factor of the node cards;
      a direct interconnect switch on the processing nodes and connected to the direct interconnect fabric, for virtualizing access of the storage nodes and the I/O nodes by the plurality of processors;
   a first modified dis-aggregated chassis comprising:
      a direct interconnect fabric having interconnect that connects node cards;
      processing nodes each having a plurality of processors for executing instructions;
      storage nodes for controlling storage media that stores files;
      Input/Output I/O nodes each having a network interface controller (NIC) for connecting to a network link;
      wherein the I/O nodes comprise a first I/O node for connecting to a first local network link, a second I/O node for connecting to a second local network link, and a third I/O node for connecting to an external network link;

a gateway for connecting to an external network through the external network link;

wherein the processing nodes are formed on a first form factor of the node cards;

wherein the storage nodes are formed on a second form factor of the node cards;

wherein the I/O nodes are formed on a third form factor of the node cards;

a direct interconnect switch on the processing nodes and connected to the direct interconnect fabric, for virtualizing access of the storage nodes and the I/O nodes by the plurality of processors;

wherein each dis-aggregated chassis connects to at least two other dis-aggregated chassis using the first local network link and the second local network link and the third local network link;

wherein the first modified dis-aggregated chassis connects to at least two other dis-aggregated chassis using the first local network link and the second local network link;

wherein the plurality of dis-aggregated chassis and the first modified dis-aggregated chassis are connected together by a mesh of local network links.

14. The dis-aggregated data cluster of claim 13 wherein the gateway comprises:

a firewall for blocking unauthorized incoming traffic from the external network; and a load-balancer for distributing incoming requests from the external network among the processing nodes in the dis-aggregated data cluster.

15. A dis-aggregated data center comprising:

a plurality of dis-aggregated chassis, each dis-aggregated chassis comprising:

direct interconnect fabric means for interconnecting node cards;

processing nodes each having a plurality of processor means for executing instructions;

storage nodes for controlling storage media that stores files;

Input/Output (I/O) nodes each having a network interface controller (NIC) means for connecting to a network link;

wherein the I/O nodes comprise a first I/O node for connecting to a first local network link, a second I/O node for connecting to a second local network link, and a third I/O node for connecting to a third local network link;

wherein the processing nodes are formed on first node cards;

wherein the storage nodes are formed on second node cards;

wherein the I/O nodes are formed on third node cards;

direct interconnect switch means, on the processing nodes and connected to the direct interconnect fabric means, for virtualizing access of the storage nodes and the I/O nodes by the plurality of processors means;

a dis-aggregated data cluster which comprises a plurality of the dis-aggregated chassis wherein each dis-aggregated chassis in the dis-aggregated data cluster connects to at least two other dis-aggregated chassis in the dis-aggregated data cluster using the first local network link and the second local network link and the third local network link;

a first data-center LAN link in the dis-aggregated data cluster, wherein the first data-center LAN link is one of the third local network links that does not connect to LAN links for other dis-aggregated chassis in the dis-aggregated data cluster;

a second data-center LAN link in the dis-aggregated data cluster, wherein the second data-center LAN link is one of the third local network links that does not connect to LAN links for other dis-aggregated chassis in the dis-aggregated data cluster;

a first gateway to an external network, the first gateway connected to the first data-center LAN link; and a second gateway to the external network, the second gateway connected to the second data-center LAN link, whereby processing, storage, and I/O nodes are dis-aggregated into each dis-aggregated chassis.

16. The dis-aggregated data center of claim 15 wherein the dis-aggregated data center further comprises a plurality of the dis-aggregated data clusters;

wherein the first gateway further comprises:

first firewall means for blocking unauthorized incoming traffic from the external network; and first load-balancer means for distributing incoming requests from the external network among the processing nodes in the dis-aggregated data center;

wherein the second gateway further comprises:

second firewall means for blocking unauthorized incoming traffic from the external network; and second load-balancer means for distributing incoming requests from the external network among the processing nodes in the dis-aggregated data center.

17. The dis-aggregated data center of claim 16 wherein the first gateway further comprises first core switch means for connecting to the first data-center LAN link of each dis-aggregated data cluster in the plurality of the dis-aggregated data clusters;

wherein the second gateway further comprises second core switch means for connecting to the second data-center LAN link of each dis-aggregated data cluster in the plurality of the dis-aggregated data cluster.

18. The dis-aggregated data center of claim 17 wherein each of the processing nodes further comprises:

a main memory for storing instructions executed by a Central Processing Unit (CPU) in the plurality of processor means;

a local peripheral bus;

a north bridge that couples the main memory to the CPU, and drives the local peripheral bus with the peripheral requests generated by the CPU;

a south bridge interconnect fabric chip that comprises:

an I/O bus interface for physically interfacing to the local peripheral bus;

a virtual network controller that acts as a virtual endpoint for network-protocol requests from the CPU to access a network;

a virtual generic peripheral controller that acts as a virtual endpoint for generic requests from the CPU to access a virtualized local peripheral;

wherein the virtualized local peripheral appears to be located on the local peripheral bus and is addressable on the local peripheral bus by unmodified software running on the CPU that is not modified for virtualizing accesses of peripheral devices;

an I/O mapper that maps the network-protocol requests from the CPU to a first interconnect address, and that maps the generic requests from the CPU to a second interconnect address;

a packet formatter that encapsulates the network-protocol requests into interconnect packets, and that encapsulates the generic requests into interconnect packets; and a fabric interface that sends and receives interconnect packets over the direct interconnect fabric means.

19. The dis-aggregated data center of claim 18 wherein each of the I/O nodes further comprises:

an interconnect switch for sending and receiving interconnect packets from the direct interconnect fabric means;

a remote packet formatter for extracting the network-protocol requests and the generic requests from the interconnect packets, and for encapsulating reply data into interconnect packets sent back to the processing nodes through the direct interconnect fabric means;

a remote network interface card that receives the network-protocol requests from the remote packet formatter, and sends and receives network packets over an external network in response to the network-protocol requests, and generates reply data received from the external network.

20. The dis-aggregated data center of claim 19 wherein each of the storage nodes further comprises:

an interconnect switch for sending and receiving interconnect packets from the direct interconnect fabric means;

a remote packet formatter for extracting the network-protocol requests and the generic requests from the interconnect packets, and for encapsulating reply data into interconnect packets sent back to the processing nodes through the direct interconnect fabric means; and a remote generic peripheral controller that receives the generic requests from the remote packet formatter, the remote generic peripheral controller accessing a hard disk to generate the reply data in response to generic requests to access the hard disk.

* * * * *

UNITED STATES PATENT AND TRADEMARK OFFICE
CERTIFICATE OF CORRECTION

PATENT NO. : 8,140,719 B2
APPLICATION NO. : 12/435618
DATED : March 20, 2012
INVENTOR(S) : Gary R. Lauterbach et al.

It is certified that error appears in the above-identified patent and that said Letters Patent is hereby corrected as shown below:

In the Claims:

Column 12, Line 53, please change

"a load-balancer for distributing incoming requests from the external network among the processing nodes in the plurality of dis-aggregated compute/switch/storage chassis;
a first data-center LAN link in the modified dis-aggregated compute/switch/storage chassis, wherein the first data-center LAN link is one of the LAN links that does not connect to LAN links for other dis-aggregated compute/switch/storage chassis;
wherein the third subset comprises at least three I/O nodes for connecting to at least three LAN links;
wherein each dis-aggregated compute/switch/storage chassis connects to at least three other dis-aggregated compute/switch/storage chassis in the plurality of dis-aggregated compute/switch/storage chassis;
wherein the modified dis-aggregated compute/switch/storage chassis connects to at least two other dis-aggregated compute/switch/storage chassis in the plurality of dis-aggregated compute/switch/storage chassis and the modified dis-aggregated compute/switch/storage chassis are connected together by a mesh of the LAN links."

to

--a second data-center LAN link in the dis-aggregated data cluster, wherein the second data-center LAN link is one of the LAN links that does not connect to LAN links for other dis-aggregated compute/switch/storage chassis;
a second core switch; and
a second gateway for connecting to an external network;
wherein the second core switch is coupled to the second data-center LAN link for each dis-aggregated data cluster in the plurality of the dis-aggregated data clusters;
wherein the second core switch is also coupled to the second gateway.--

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,140,719 B2

Column 13, Line 33, please change

"whereby the remote peripherals are accessed remotely through the direct interconnect fabric and virtual end-points appear to be on the local peripheral bus from the point of view of software executing on the processor."

to

--a load-balancer for distributing incoming requests from the external network among the processing nodes in the plurality of dis-aggregated compute/switch/storage chassis;
a first data-center LAN link in the modified dis-aggregated compute/switch/storage chassis, wherein the first data-center LAN link is one of the LAN links that does not connect to LAN links for other dis-aggregated compute/switch/storage chassis;
wherein the third subset comprises at least three I/O nodes for connecting to at least three LAN links, wherein each dis-aggregated compute/switch/storage chassis connects to at least three other dis-aggregated compute/switch/storage chassis in the plurality of dis-aggregated compute/switch/storage chassis;
wherein the modified dis-aggregated compute/switch/storage chassis connects to at least two other dis-aggregated compute/switch/storage chassis in the plurality of dis-aggregated compute/switch/storage chassis and the modified dis-aggregated compute/switch/storage chassis are connected together by a mesh of the LAN links.--

Column 13, Line 51, please change

"a second data-center LAN link in the dis-aggregated data cluster, wherein the second data-center LAN link is one of the LAN links that does not connect to LAN links for other dis-aggregated compute/switch/storage chassis;
a second core switch; and
a second gateway for connecting to an external network;
wherein the second core switch is coupled to the second data-center LAN link for each dis-aggregated data cluster in the plurality of the dis-aggregated data clusters;
wherein the second core switch is also coupled to the second gateway."

to

--whereby the remote peripherals are accessed remotely through the direct interconnect fabric and virtual end points appear to be on the local peripheral bus from the point of view of software executing the processor.--

Column 16, Line 40, please correct "plurality of the dis-aggregated data cluster," to --plurality of the dis-aggregated data clusters.--